E. C. BACHFIELD.
LEVELING INSTRUMENT.
APPLICATION FILED APR. 16, 1917.
1,256,097.
Patented Feb. 12, 1918.
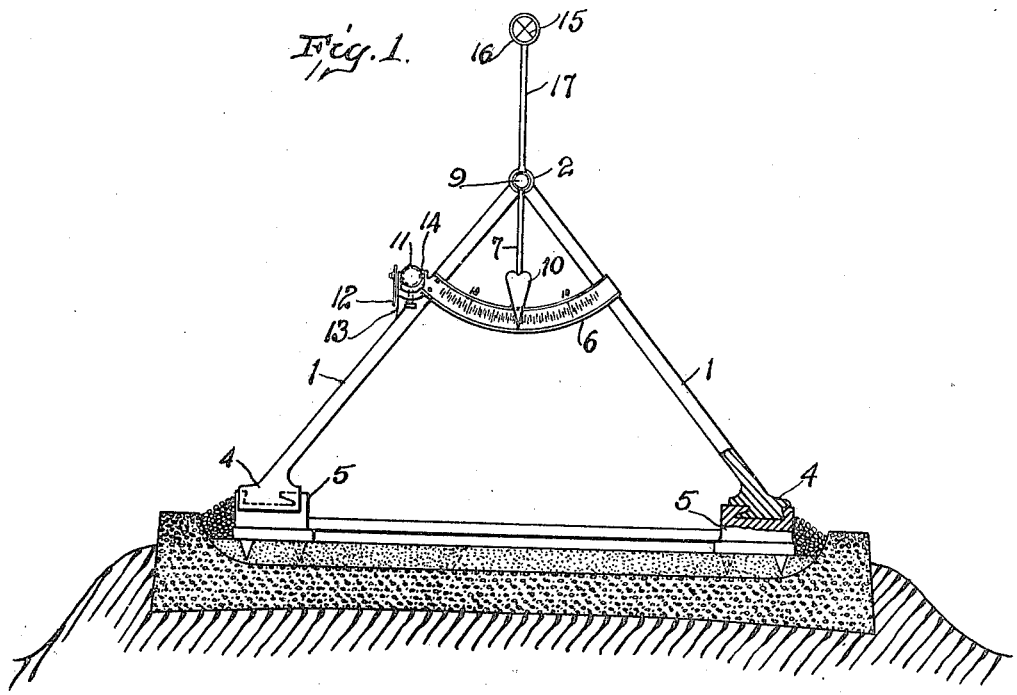
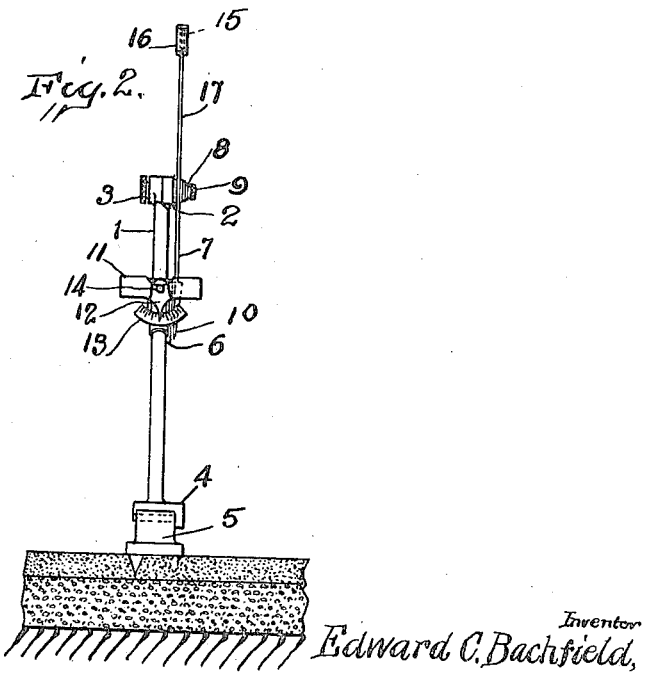
Inventor
Edward C. Bachfield,
Attorneys.

UNITED STATES PATENT OFFICE.

EDWARD C. BACHFIELD, OF INDIANAPOLIS, INDIANA.

LEVELING INSTRUMENT.

1,256,097.     Specification of Letters Patent.     Patented Feb. 12, 1918.

Application filed April 16, 1917. Serial No. 162,244.

*To all whom it may concern:*

Be it known that I, EDWARD C. BACHFIELD, a citizen of the United States, residing at Indianapolis, in the county of Marion and State of Indiana, have invented certain new and useful Improvements in Leveling Instruments, of which the following is a specification, reference being had therein to the accompanying drawing.

This invention relates to improvements in leveling instruments designed particularly for use in establishing the altitude of one line of rails of a railway track with respect to the other line of rails and for determining the grade or inclination of the rails. The instrument is used for these purposes, preferably by being mounted on the cross ties upon which the rails will later be laid.

My leveling instrument comprises standards or legs adapted to rest upon the ties and combine with a graduated arc and pendulum operating in conjunction with such arc after the manner of a vernier in a surveyor's transit. The instrument also comprises cross-hairs carried on a stem mounted on the standards, the cross-hairs to form the "object" to be observed through the telescope of a surveyor's transit when this leveling instrument is used in conjunction with such transit, as hereinafter pointed out.

The instrument further comprises a spirit level and its graduated arc to determine the grade or inclination of the ties, as also hereinafter pointed out.

In the accompanying drawings, Figure 1 is a front elevation of my improved leveling instrument shown mounted on a railway tie; and Fig. 2 is a side elevation of the instrument.

The frame comprises a pair of standards designated 1, secured together at their apex, as by a bolt 2 and a knurled nut 3. They spread apart at their lower ends and are fashioned to rest upon a cross tie of a railway; or, as shown, are constructed with a shoe 4 to fit in the rail seat of a tie block 5 constructed in accordance with the tie or tie block set forth in my application filed April 16th, 1917, Ser. No. 162,243. But the instrument may be used with any kind of a cross tie or may be placed upon the rails after they are laid on the ties.

Secured to the standards at a convenient place is a graduated plate 6 having graduations representing degrees and minutes as 10° and 20'. A pendulum 7 is pivoted to the standards by fitting over a reduced portion 8 of the bolt 2 where it is held by a nut 9. The lower end of the pendulum is in the form of a pointer 10 which in a sense performs somewhat the office of a vernier in a surveyor's transit, except that the pointer is not graduated, yet it works in conjunction with the scale on the plate 6 for showing whether the instrument is standing horizontal with both feet at the same altitude or tipped to one side with one foot higher than the other. Thus, if the instrument is stood upon a railway tie or rails and both ends of the tie are to be level or of the same altitude, the pointer will stand at zero on the graduated plate, while if one end of the tie is to be elevated, as on the curves of railway beds, the degree of elevation of the one end of the tie compared with the other would be shown by the position of the pointer on the graduated plate, as by pointing at, say 5° or 10° or to some fraction of a degree indicated by a minute line, as 5° 30'.

By this simple instrument the constructor can determine the end to end inclination of each tie or the altitude of one end compared to the other, and he can do so with perfect accuracy and quickness. And the instrument can be used either in the process of laying the ties before the rails are applied, as preferably in the case of the use of the improved road-bed and ties set forth in my applications filed April 16th, 1917, and bearing the respective Serial Number 162,242 and 162,243, or may be used after the rails are laid upon the ties and the latter are being set in position and the material tamped under them.

Then with respect to determining the grade of the road, that is, of setting the upper surface of the ties, and consequently, the rails, at the grade or inclination desired I use the spirit level 11 with its pointer 12 and a graduated plate 13 mounted on one of the standards. This spirit level is carried on pivots 14 and the pendulum 12 is sufficiently weighted to cause it to maintain a vertical position irrespective of the forward or backward inclination of the standards.

It will be understood that the feet of the standards resting flat upon the ties (or on the rails as the case might be) will cause the standards to rise vertically or to recline backward or forward according to whether the grade is upward or downward at the given point. Assume that the grade is upward or is to be upward. Then the tie will be set with its upper surface at such inclination and the degree of inclination will be shown by the position of the pendulum 12 with respect to the graduations on the plate 13, say 5° or 5° 30'. The grade desired being known from the previous survey the users of this instrument will adjust the position of the ties until they come to this grade and will use this instrument to show when they are set at such grade.

It will be understood that the spirit level will merely show when the standards are vertical or inclined in addition to what would be shown by the pendulum 12 and graduated plate 13. For this reason the spirit level may be omitted.

Referring now to the cross-hairs they are indicated at 15, being in the nature of fine wires secured to a ring 16 mounted on a rod 17 suitably secured to the upper end of the standards. This cross wire device is in the nature of an attachment which may or may not be used or included in the rest of the instrument. When present and used its use will be in conjunction with a surveyor's transit. The cross wires 15 will represent the "object" on which the line of sight through the telescope will be brought. In this case this leveling instrument will be shifted from side to side until the intersection of these cross wires coincides with the vertical cross-hair of the telescope. In this way this "object" would be set on a line prolonged from the transit through the point at which the telescope has been sighted. In this way this instrument can be used in connection with a transit in "prolonging" straight lines in the usual way practised by surveyors, when they set the transit at one point, sight to a point ahead and thence project the line straight ahead onward and set the "object" so that it will be intersected by this prolonged line.

I have referred above to my application filed April 16th, 1917, Ser. No. 162,242, relating to an improved road-bed. For the purpose of showing one manner of use of the present invention I have illustrated the character of base, sub-base and cross tie embodied in said application. But, of course, it will be understood that the present invention may be used in setting or laying any character of cross tie and railway rail.

Having thus fully described my invention, what I claim as new and desire to secure by Letters Patent, is:—

1. In a leveling instrument, a frame comprising standards spread apart at their feet, a graduated plate secured to said standards, a pendulum swung from the frame and coöperating with said plate to determine the altitude of one foot of the standards with respect to the other, a pointer pivoted on the frame and a graduated plate connected to the latter to coöperate with the pointer, the pendulum adapted to swing in a lateral plane and the pointer to swing in a fore and aft plane.

2. In a leveling instrument, a frame composed of standards having feet at one end and brought to an apex at the other, a pendulum swung from said apex, and a cross wire device mounted above said apex, a graduated plate to coöperate with the pendulum, a spirit level pivoted to one standard, a depending pointer connected with the spirit level, and a graduated plate for said pointer.

In testimony whereof, I affix my signature.

EDWARD C. BACHFIELD.

Copies of this patent may be obtained for five cents each, by addressing the "Commissioner of Patents, Washington, D. C."